(12) United States Patent
Adelman et al.

(10) Patent No.: US 11,008,917 B2
(45) Date of Patent: May 18, 2021

(54) DEF DOSING USING MULTIPLE DOSING LOCATIONS WHILE MAINTAINING HIGH PASSIVE SOOT OXIDATION

(71) Applicant: International Engine Intellectual Property Company, LLC, Lisle, IL (US)

(72) Inventors: Bradley Jay Adelman, Chicago, IL (US); Navtej Singh, Arlington Heights, IL (US); Umang Khanna, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 102 days.

(21) Appl. No.: 16/112,124

(22) Filed: Aug. 24, 2018

(65) Prior Publication Data
US 2020/0063625 A1    Feb. 27, 2020

(51) Int. Cl.
| | |
|---|---|
| *F01N 3/20* | (2006.01) |
| *F01N 13/16* | (2010.01) |
| *F01N 3/021* | (2006.01) |
| *F01N 9/00* | (2006.01) |
| *F01N 13/00* | (2010.01) |

(52) U.S. Cl.
CPC ............. *F01N 3/208* (2013.01); *F01N 3/021* (2013.01); *F01N 9/00* (2013.01); *F01N 13/009* (2014.06); *F01N 13/16* (2013.01); *F01N 2250/02* (2013.01); *F01N 2370/04* (2013.01); *F01N 2610/01* (2013.01); *F01N 2900/1602* (2013.01)

(58) Field of Classification Search
CPC .. F01N 13/009; F01N 2610/02; F01N 3/2066; F01N 3/208
See application file for complete search history.

(56) References Cited

U.S. PATENT DOCUMENTS

| | | | |
|---|---|---|---|
| 2010/0281855 A1* | 11/2010 | Sun | F01N 3/208 60/286 |
| 2015/0068198 A1 | 3/2015 | Shovels et al. | |
| 2015/0086426 A1* | 3/2015 | DeGeorge | F01N 3/208 422/108 |
| 2017/0234188 A1 | 8/2017 | Singh et al. | |
| 2018/0230875 A1* | 8/2018 | Nilsson | F01N 9/00 |
| 2019/0376429 A1* | 12/2019 | Burge | F01N 3/2066 |
| 2020/0095913 A1* | 3/2020 | Rohde | F01N 3/0236 |
| 2020/0116063 A1* | 4/2020 | Bleckmann | B01D 53/9436 |

* cited by examiner

*Primary Examiner* — Anthony Ayala Delgado
(74) *Attorney, Agent, or Firm* — Jack D. Nimz; Mark C. Bach

(57) ABSTRACT

Diesel Exhaust Fluid is metered into an engine exhaust gas aftertreatment system having a close coupled SCR catalyst and a main SCR catalyst. The DEF is injected into two injector locations, one upstream of the close coupled SCR catalyst and another upstream of the main SCR catalyst, the quantity of DEF in each injector being based on primarily the temperature at the main SCR catalyst and the mass flow of the NOx through the aftertreatment system. This method of injection enables a relatively better fuel economy outcome while meeting the regulated tailpipe $NO_x$ emission levels and the $N_2O$ formation limits.

11 Claims, 7 Drawing Sheets

Table 1: Desired DEF dosing rate based on mass NOx and temperature

| temp \ flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | 4.00 | 4.80 | 5.76 | 6.91 | 8.29 | 9.95 | 11.94 | 14.33 | 17.20 | 20.64 |
| 180 | 4.00 | 4.80 | 5.76 | 6.91 | 8.29 | 9.95 | 11.94 | 14.33 | 17.20 | 20.64 |
| 220 | 4.00 | 4.80 | 5.76 | 6.91 | 8.29 | 9.95 | 11.94 | 14.33 | 17.20 | 20.64 |
| 260 | 4.00 | 4.80 | 5.76 | 6.91 | 8.29 | 9.95 | 11.94 | 14.33 | 17.20 | 20.64 |
| 300 | 4.00 | 4.80 | 5.76 | 6.91 | 8.29 | 9.95 | 11.94 | 14.33 | 17.20 | 20.64 |
| 340 | 4.20 | 5.04 | 6.05 | 7.26 | 8.71 | 10.45 | 12.54 | 15.05 | 18.06 | 21.67 |
| 380 | 4.41 | 5.29 | 6.35 | 7.62 | 9.14 | 10.97 | 13.17 | 15.80 | 18.96 | 22.75 |
| 420 | 4.63 | 5.56 | 6.67 | 8.00 | 9.60 | 11.52 | 13.83 | 16.59 | 19.91 | 23.89 |
| 460 | 4.86 | 5.83 | 7.00 | 8.40 | 10.08 | 12.10 | 14.52 | 17.42 | 20.91 | 25.09 |
| 500 | 5.11 | 6.13 | 7.35 | 8.82 | 10.59 | 12.70 | 15.24 | 18.29 | 21.95 | 26.34 |

Relies on prior art to calculate total DEF dosing levels requested

Table used for DEF dosing command

| temp \ flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | 4.00 | 4.80 | 5.76 | 6.91 | 8.29 | 9.95 | 11.94 | 14.33 | 17.20 | 20.64 |
| 180 | 4.00 | 4.80 | 5.76 | 6.91 | 8.29 | 9.95 | 11.94 | 14.33 | 17.20 | 20.64 |
| 220 | 4.00 | 4.80 | 5.76 | 6.91 | 8.29 | 9.95 | 11.94 | 14.33 | 17.20 | 20.64 |
| 260 | 4.00 | 4.80 | 5.76 | 6.91 | 8.29 | 9.95 | 11.94 | 14.33 | 17.20 | 20.64 |
| 300 | 4.00 | 4.80 | 5.76 | 6.91 | 8.29 | 9.95 | 11.94 | 14.33 | 17.20 | 20.64 |
| 340 | 4.20 | 5.04 | 6.05 | 7.26 | 8.71 | 10.45 | 12.54 | 15.05 | 18.06 | 21.67 |
| 380 | 4.41 | 5.29 | 6.35 | 7.62 | 9.14 | 10.97 | 13.17 | 15.80 | 18.96 | 22.75 |
| 420 | 4.63 | 5.56 | 6.67 | 8.00 | 9.60 | 11.52 | 13.83 | 16.59 | 19.91 | 23.89 |
| 460 | 4.86 | 5.83 | 7.00 | 8.40 | 10.08 | 12.10 | 14.52 | 17.42 | 20.91 | 25.09 |
| 500 | 5.11 | 6.13 | 7.35 | 8.82 | 10.59 | 12.70 | 15.24 | 18.29 | 21.95 | 26.34 |

Table 1: Desired DEF dosing rate based on mass NOx and temperature

| temp\flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | 1.00 | 1.00 | 0.90 | 0.85 | 0.85 | 0.85 | 0.80 | 0.80 | 0.80 | 0.75 |
| 180 | 1.00 | 0.90 | 0.75 | 0.75 | 0.70 | 0.70 | 0.65 | 0.65 | 0.65 | 0.60 |
| 220 | 0.75 | 0.60 | 0.50 | 0.50 | 0.45 | 0.45 | 0.40 | 0.40 | 0.40 | 0.35 |
| 260 | 0.50 | 0.40 | 0.40 | 0.40 | 0.40 | 0.40 | 0.35 | 0.35 | 0.35 | 0.35 |
| 300 | 0.30 | 0.30 | 0.30 | 0.30 | 0.30 | 0.30 | 0.25 | 0.25 | 0.25 | 0.25 |
| 340 | 0.40 | 0.40 | 0.40 | 0.40 | 0.40 | 0.40 | 0.35 | 0.35 | 0.35 | 0.35 |
| 380 | 0.40 | 0.40 | 0.40 | 0.40 | 0.40 | 0.40 | 0.35 | 0.35 | 0.35 | 0.35 |
| 420 | 0.50 | 0.50 | 0.50 | 0.50 | 0.45 | 0.45 | 0.40 | 0.40 | 0.40 | 0.35 |
| 460 | 0.50 | 0.50 | 0.50 | 0.50 | 0.45 | 0.45 | 0.40 | 0.40 | 0.40 | 0.35 |
| 500 | 0.60 | 0.60 | 0.60 | 0.60 | 0.55 | 0.55 | 0.50 | 0.50 | 0.50 | 0.45 |

Table 2: Fraction of DEF dosing rate at injector 52 based on mass NOx and temperatures

| temp\flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | 1.00 | 1.00 | | | | | | | | |
| 180 | 1.00 | | | | | | | | | |
| 220 | | | | | | | | | | |
| 260 | | | | | | | | | | |
| 300 | | | | | | | | | | |
| 340 | | | | | | | | | | |
| 380 | | | | | | | | | | |
| 420 | | | | | | | | | | |
| 460 | | | | | | | | | | |
| 500 | | | | | | | | | | |

FIG. 7A

| temp\flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | | | 0.90 | 0.85 | 0.85 | 0.85 | 0.80 | 0.80 | 0.80 | 0.75 |
| 180 | | 0.90 | 0.75 | 0.75 | 0.70 | 0.70 | 0.65 | 0.65 | 0.65 | 0.60 |
| 220 | 0.75 | 0.60 | | | | | | | | |
| 260 | | | | | | | | | | |
| 300 | | | | | | | | | | |
| 340 | | | | | | | | | | |
| 380 | | | | | | | | | | |
| 420 | | | | | | | | | | |
| 460 | | | | | | | | | | |
| 500 | | | | | | | | | | |

FIG. 7B

| temp\flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | | | | | | | | | | |
| 180 | | | | | | | | | | |
| 220 | | | 0.50 | 0.50 | 0.45 | 0.45 | 0.40 | 0.40 | 0.40 | 0.35 |
| 260 | 0.50 | 0.40 | 0.40 | 0.40 | 0.40 | 0.40 | 0.35 | 0.35 | 0.35 | 0.35 |
| 300 | 0.30 | 0.30 | 0.30 | 0.30 | 0.30 | 0.30 | 0.25 | 0.25 | 0.25 | 0.25 |
| 340 | 0.40 | 0.40 | 0.40 | 0.40 | 0.40 | 0.40 | 0.35 | 0.35 | 0.35 | 0.35 |
| 380 | 0.40 | 0.40 | 0.40 | 0.40 | 0.40 | 0.40 | 0.35 | 0.35 | 0.35 | 0.35 |
| 420 | | | | | | | | | | |
| 460 | | | | | | | | | | |
| 500 | | | | | | | | | | |

FIG. 7C

| temp\flow | 0.20 | 0.24 | 0.29 | 0.35 | 0.41 | 0.50 | 0.60 | 0.72 | 0.86 | 1.03 |
|---|---|---|---|---|---|---|---|---|---|---|
| 160 | | | | | | | | | | |
| 180 | | | | | | | | | | |
| 220 | | | | | | | | | | |
| 260 | | | | | | | | | | |
| 300 | | | | | | | | | | |
| 340 | | | | | | | | | | |
| 380 | | | | | | | | | | |
| 420 | 0.50 | 0.50 | 0.50 | 0.50 | 0.45 | 0.45 | 0.40 | 0.40 | 0.40 | 0.35 |
| 460 | 0.50 | 0.50 | 0.50 | 0.50 | 0.45 | 0.45 | 0.40 | 0.40 | 0.40 | 0.35 |
| 500 | 0.60 | 0.60 | 0.60 | 0.60 | 0.55 | 0.55 | 0.50 | 0.50 | 0.50 | 0.45 |

FIG. 7D

DEF DOSING USING MULTIPLE DOSING LOCATIONS WHILE MAINTAINING HIGH PASSIVE SOOT OXIDATION

TECHNICAL FIELD

The present disclosure relates to a system and method of dosing diesel exhaust fluid (DEF) into exhaust gas created by combustion of hydrocarbon fuel in an internal combustion engine, for aftertreatment of oxides of nitrogen ($NO_x$) in the exhaust gas, by the use of a Selective Catalytic Reduction (SCR) Catalyst.

BACKGROUND

Selective catalytic reduction is a known technology for reducing NOx in engine exhaust gas. Currently manufactured vehicles which are propelled by internal combustion engines, such as diesel engines, and which use selective catalytic reduction (SCR) as part of an exhaust aftertreatment strategy, carry an on-board supply of diesel exhaust fluid (DEF) from which DEF is metered in controlled quantity into the engine exhaust system upstream of a SCR catalyst. DEF is a standardized aqueous urea solution which comprises 32.5% urea and 67.5% de-ionized water. The chemistry of SCR aftertreatment of engine exhaust gas using DEF is well-documented. When DEF is introduced into engine exhaust gas of sufficiently high temperature, the water evaporates and the urea decomposes to create ammonia. Ongoing reactions in the presence of the catalyst reduce NOx into nitrogen, and water and produce $N_2O$.

Current aftertreatment systems that comply with US EPA 2010 tailpipe emissions and Phase 1 GHR use an architecture of a Diesel Oxidation Catalyst (DOC)/Diesel Particulate Filer (DPF) combo, DEF injection/mixing and SCR/Ammonia Oxidation Catalyst (AMOX). The DOC/DPF are placed upstream so that the high $NO_x$/soot ratio will facilitate passive regeneration of soot. The downstream SCR/AMOX system is therefore delayed in achieving light off temperatures because the DOC/DPF combo acts as a large thermal sink. As a result, high engine out NOx levels that would be desired for improved fuel economy/GHG are not able to meet the 0.2 g/hp·hr tailpipe emissions limit. Placing the SCR upstream of the DOC/DPF would significantly lower the NOx/soot ratio entering the DPF and result in little to no passive soot oxidation. This would require frequent active regeneration of the filter. This, in turn, is a fuel penalty and the additional thermal aging to the aftertreatment adds costs and complexity to aftertreatment design.

Engine out $NO_x$ levels are limited to ~5 g/hp·hr and usually are much lower. This limits the fuel economy benefits in advanced combustion engines where $NO_x$ emissions may be higher than 10 g/hp·hr. Moreover, the aftertreatment system only utilizes a single (though it may be comprised of multiple bricks) SCR catalyst that is downstream of the DOC/DPF. Once a desired total DEF dosing quantity is calculated, that value can be transmitted to the injection system for the SCR catalyst. Moreover, since the SCR catalyst in the standard design is after the DOC/DPF, it is generally not permissible to utilize a vanadium (V) based SCR formulation. This is a result of the propensity of vanadium formulations to release $V_2O_5$ when exposed to temperatures above 550° C. These temperatures may be achieved after the DOC/DPF under standard operating conditions such as an active regeneration event or could be achieved from a malfunctioning state such as high HC slip from the DOC or high rate of soot oxidation during a drop to idle event. Vanadia formulations (as well as Fe zeolite) have the benefit of lower costs and lower $N_2O$ production however V formulations are not used in current (US 2010 on-highway emissions) systems since they would be placed downstream of the DOC/DPF.

There exists a need to design a system that enables a relatively better fuel economy outcome while meeting the regulated tailpipe $NO_x$ emission levels and the $N_2O$ formation limits.

SUMMARY

Embodiments described herein relate to an internal combustion engine with an exhaust aftertreatment system comprising of a diesel oxidation catalyst, a diesel particulate filter, a close coupled SCR catalyst upstream of the diesel oxidation catalyst and diesel particulate filter, a main SCR catalyst downstream of the diesel oxidation catalyst and diesel particulate filter; and a DEF dosing system comprising of a first injector for injecting a fraction of the commanded total DEF into the close coupled SCR catalyst and a second injector for injecting the remaining fraction of the commanded total DEF into the main SCR catalyst. Additionally, the internal combustion engine comprises of a DEF controller or an Engine control module to calculate the fraction of total DEF to be injected into each of the first and the second injectors based on the temperature of the main SCR catalyst and a mass flow of the NOR flowing into the exhaust aftertreatment system.

Additionally, the embodiments described herein relate to a control system of an internal combustion engine with a DEF controller for calculating a fraction of the total DEF dosing into a first injector location upstream of a close coupled SCR catalyst by processing data based on a main SCR catalyst temperature and a current mass flow of NOR and outputting a total DEF dosing value and a fraction of the total DEF dosing value using a plurality of pre-determined maps.

The embodiments described herein relate to a method for controlling the DEF dosing in an exhaust aftertreatment system. The method comprises the steps of processing certain data to select a pre-determined total DEF dosing value and a pre-determined fraction of the total DEF dosing value to be injected into a first injector of a close coupled SCR catalyst based on the temperature of the main SCR catalyst and the DPF, in addition to the mass flow of the $NO_x$, using upper and lower temperature limits to divide the associated calibration into four different zones, each zone determining the fraction of the total DEF dosing commanded at the first injector location upstream of the close coupled SCR catalyst.

These and other embodiments and their advantages can be more readily understood from a review of the following detailed description and the corresponding appended drawings

BRIEF DESCRIPTION OF THE DRAWINGS

FIG. 7A-7D show a breakdown of the table in FIG. 6B according to the zones highlighted in FIG. 4

DETAILED DESCRIPTION

Figure 1:
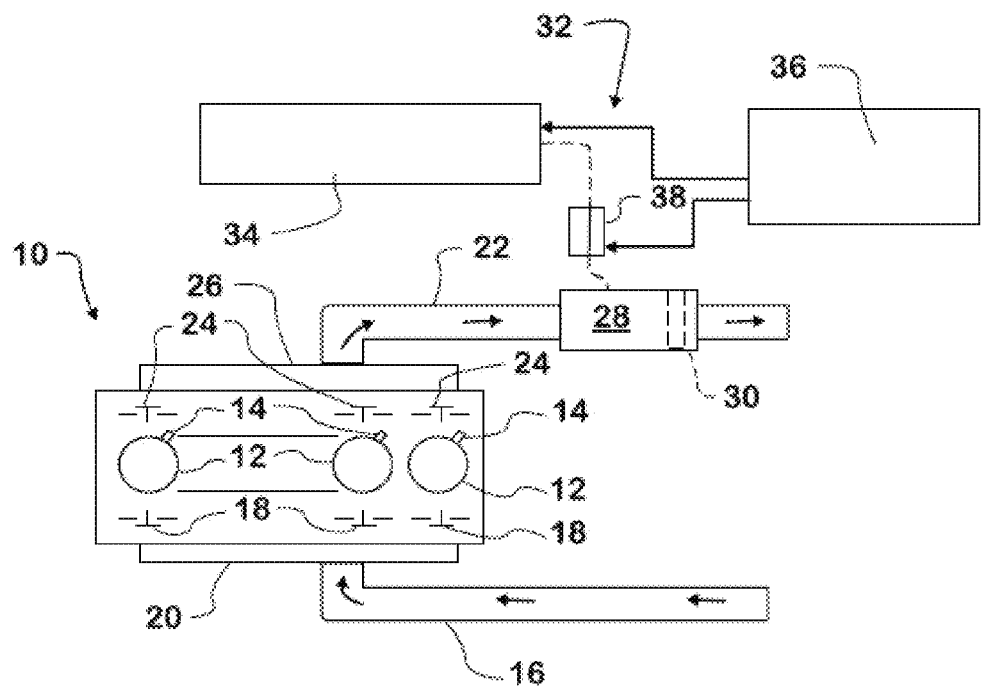
FIG. 1 is a schematic of an exemplary internal combustion engine system with aftertreatment system for NOR reduction in engine exhaust.

FIG. 1 is representative of an internal combustion engine 10 which can be used in stationary or mobile applications. For example, engine 10 may be a diesel engine of the type which propels a motor vehicle such as a truck and which comprises structure forming a number of engine cylinders 12 into which fuel is injected by fuel injectors 14 to combust with air which has entered combustion chamber spaces of engine cylinders 12 through an intake system 16 when cylinder intake valves 18 for controlling admission of air from an intake manifold 20 into respective engine cylinders 12 are open.

Engine 10 also comprises an exhaust system 22 through which engine exhaust gas 40, created by combustion of injected fuel in the combustion chamber spaces to operate engine 10, is conveyed to atmosphere. Cylinder exhaust valves 24 control admission of exhaust from respective engine cylinders 12 into an exhaust manifold 26 for further conveyance through exhaust system 22.

Exhaust system 22 includes an exhaust aftertreatment system 28, including a main SCR catalyst 30 for treating exhaust passing through aftertreatment system 28 prior to entry into the atmosphere, an intake pipe 42, and an exhaust pipe 50. A Diesel Exhaust Fluid (DEF) dosing system 32 provides urea solution for catalytic conversion of $NO_x$ in the exhaust.

DEF dosing system 32 comprises at least one DEF storage container 34 and a DEF controller 36 for controlling delivery of DEF through a DEF delivery apparatus such as a main SCR catalyst injector 38 into aftertreatment system 28 and for monitoring the DEF in the DEF dosing system 32.

Figure 2:
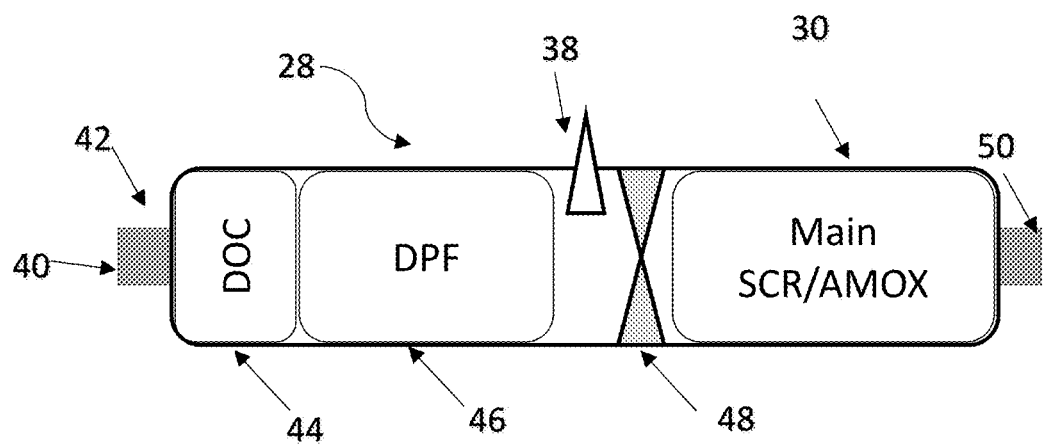
FIG. 2 is a schematic diagram of a first embodiment of an aftertreatment system having a main SCR catalyst.

FIG. 2 shows the detailed prior-art aftertreatment system, 28. Engine exhaust gas 40 coming in from the exhaust manifold 26 enters the aftertreatment system 28, at an inlet 42 of an exhaust gas flow path to exist at an outlet 50 which leads to a tailpipe (not shown). During passage along the flow path, engine exhaust gas 40 passes through one or more treatment elements.

Reductant or DEF, which chemically reduces $NO_x$ in the presence of the main SCR catalyst 30, is introduced into the exhaust gas flow path through the main SCR catalyst injector 38 located upstream of the main SCR catalyst 30. Main SCR catalyst injector 38 is part of an injector/mixer assembly which also comprises a main SCR mixer 48 downstream of the main SCR catalyst injector 38 for promoting mixing of the DEF with exhaust gas 40 for proper distribution before the mixture passes along surfaces of main SCR catalyst 30. The main SCR catalyst 30 may have a Cu/Fe Zeolite formulation or any other formulations that are tolerant to exposure to high temperatures (greater than 550° C.).

Other exhaust gas treatment elements which the aftertreatment system, 28 contains includes a Diesel Oxidation Catalyst (DOC) 44, designed to oxidize carbon monoxide, gas phase hydrocarbons, and the soluble organic fraction of diesel particulate matter to $CO_2$ and $H_2O$ and a Diesel Particulate Filter (DPF) 46, designed to remove diesel particulate matter or soot from the exhaust gas.

Figure 3:
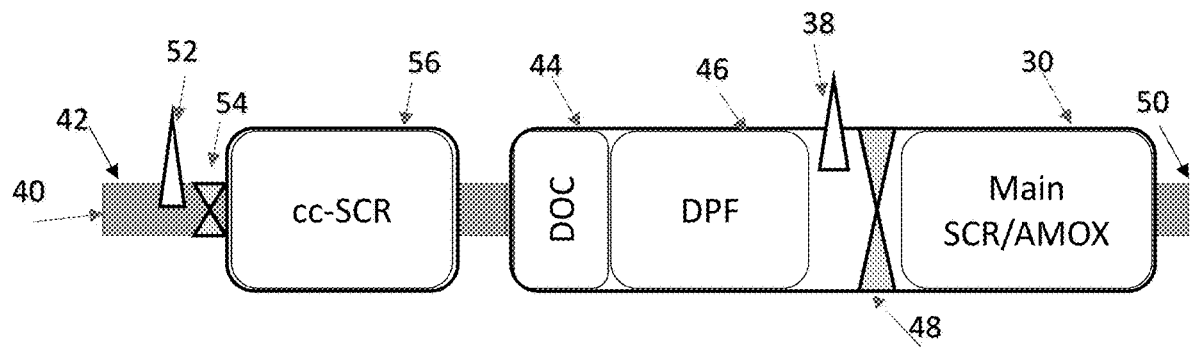
FIG. 3 is a schematic diagram of a second embodiment of an aftertreatment system having a close coupled SCR catalyst and a main SCR catalyst.

A different embodiment of an aftertreatment system, 28 with additional elements added to the aftertreatment system discussed in FIG. 2 is shown in FIG. 3. Engine exhaust gas 40, coming in from an engine exhaust manifold 26 enters the aftertreatment system 28, at an inlet 42 of an exhaust gas flow path to exit at an outlet 50, which leads to a tailpipe (not shown). During passage along the flow path, the engine exhaust gas 40 passes through one or more treatment elements. In this aftertreatment system, there is an additional selective reduction catalyst, known as a 'close coupled SCR catalyst' or a 'warm up catalyst' or a 'close coupled SCR' 56, that is arranged upstream of all the other treatment elements. The close coupled SCR catalyst 56 may be a vanadium-based formulation but other embodiments are possible, such as a Fe zeolite or Cu Zeolite.

It is known in the art that a close coupled SCR catalyst assists in reducing hydrocarbon emissions during cold start conditions, when the main SCR catalyst would still be heating up to the 'light off' temperature. Upstream of this close coupled SCR catalyst 56 is an injector/mixer assembly, comprising of a close coupled SCR catalyst injector 52, and a close coupled SCR mixer 54 downstream of the close coupled SCR catalyst injector 52 and upstream of the closed coupled SCR catalyst 56 meant for mixing the injected DEF with the exhaust gas 40 for proper distribution before the mixture passes through the close coupled SCR catalyst 56. Downstream of the close coupled SCR catalyst, 56, is the DOC 44, and the DPF 46. These are followed by the main SCR catalyst injector 38 and main SCR mixer 48, and finally the main SCR catalyst 30. The arrangement of the DOC 44, DPF 46, main SCR catalyst injector 38, main SCR mixer 48 and the main SCR catalyst 30 is essentially the same as presented in FIG. 2.

Figure 4:
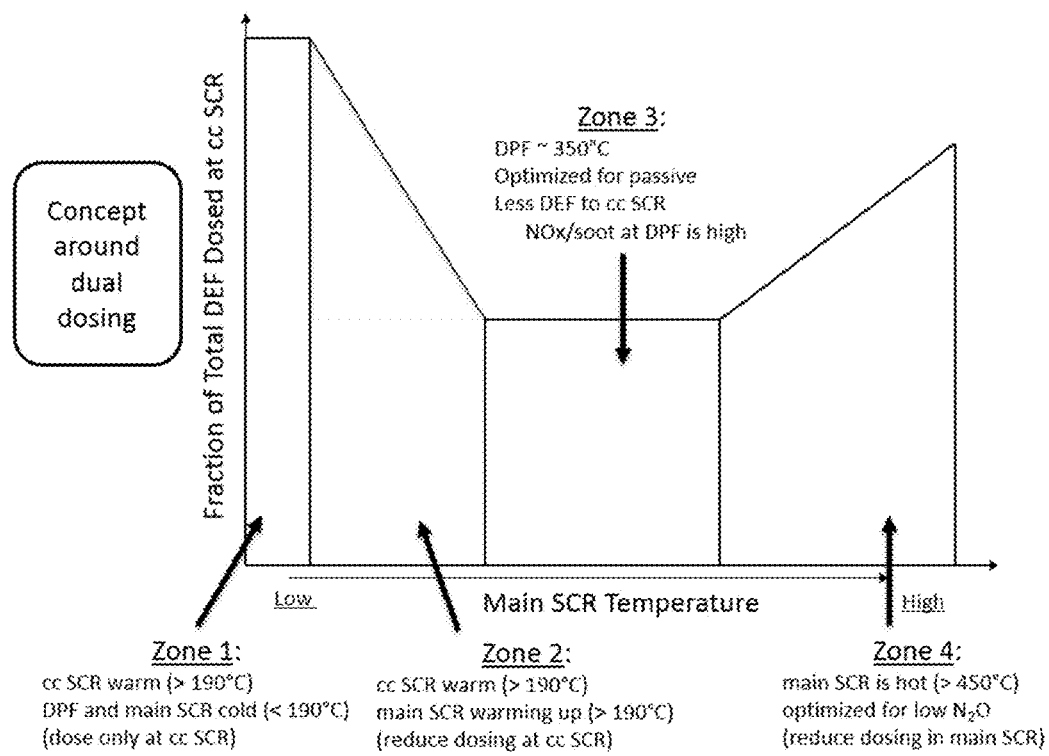
FIG. 4 is a graphical representation of the relationship between the quantity of DEF dosing at the close coupled SCR catalyst location and the temperature of the main SCR catalyst.
Figure 5:
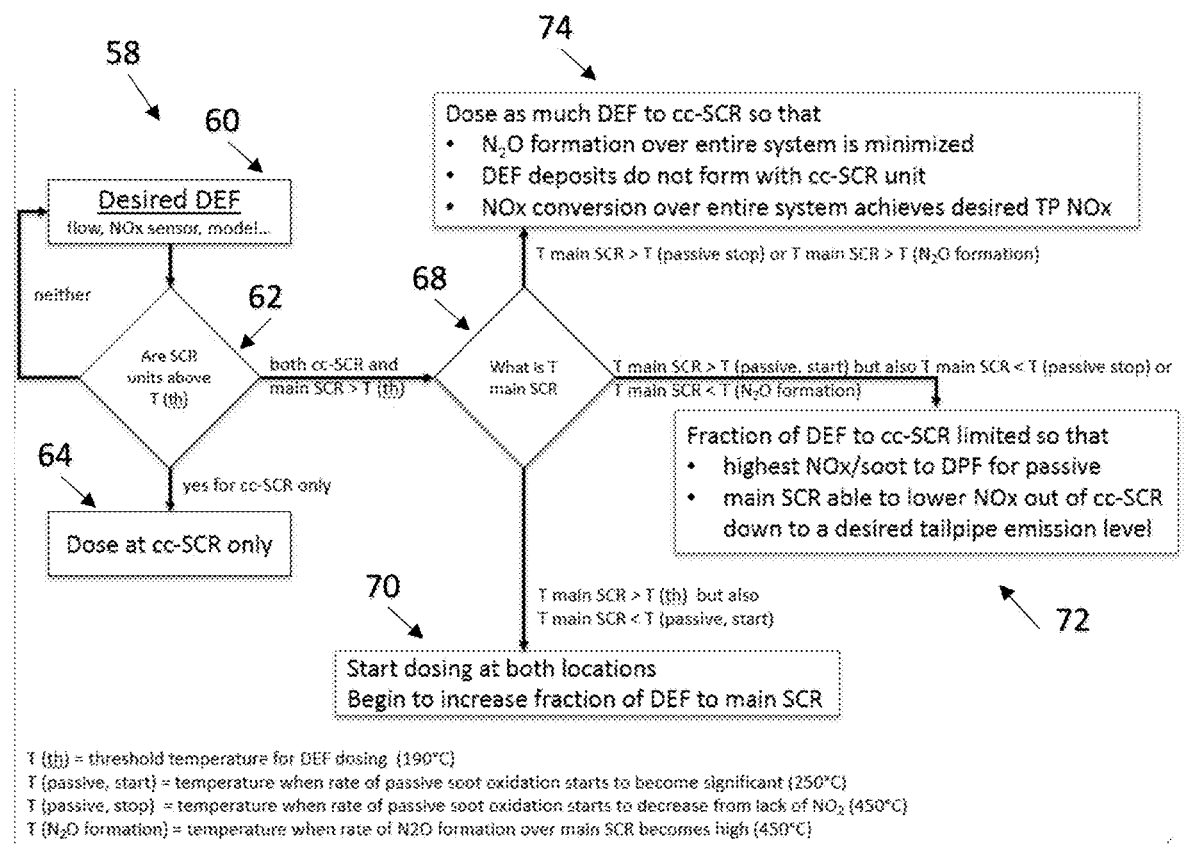
FIG. 5 is a logic diagram showing the relationship between the quantity of the DEF dosing at the close coupled SCR catalyst location and temperature of the main SCR catalyst.

This second embodiment of aftertreatment system 28 utilizes an additional map, shown in FIG. 4 and FIG. 5, for the calculation of the desired total DEF dosing at each of the injectors, close coupled SCR catalyst injector 52 and main SCR catalyst injector 38. This additional map splits the value of the desired total DEF dosing between the close coupled SCR catalyst 56 and the main SCR catalyst 30. Once a desired total DEF dosing quantity is calculated, the value is then multiplied by a 'splitter' value. This 'splitter' value is the fraction of desired total DEF to be injected through close coupled SCR catalyst injector 52 at the close coupled SCR catalyst 56 location. The additional map is calibrated based on a number of conditions, including the temperatures of the close coupled SCR catalyst 56 and the main SCR catalyst 30, and the target $NO_x$ level entering the DPF for optimized passive soot oxidation.

To explain further, FIG. 4 details the calibration of the additional map that is used to determine the desired DEF dosing to be injected through each of the two injectors, close coupled SCR catalyst injector 52 and main SCR catalyst injector 38. The calibration is based on the measured temperatures at the main SCR catalyst 30, the DPF 46 and the close coupled SCR catalyst 56 and is divided into four 'zones'. For example, temperature of the main SCR catalyst 30 may be measured using a known in the art probe in or around the center of the main SCR catalyst 30, or by averaging the temperature at the inlet and outlet of the SCR catalyst 30 using temperature sensors, amongst other methods. The DPF 46 and the close coupled SCR catalyst 56 temperatures may be measured in a similar way. Zone 1 in FIG. 4 covers the conditions when the close coupled SCR catalyst 56 is warm (greater than 190° C.), but the DPF 46 and the main SCR catalyst 30 are cold (less than 190° C.), in which case, the DEF is dosed only through close coupled SCR catalyst injector 52 at the close-coupled SCR catalyst 56, with the purpose of directing the DEF to the SCR unit capable of high $NO_x$ conversion, which in zone 1, is the close coupled SCR catalyst 56. In zone 1, the main SCR catalyst 30 is below the temperature for optimal performance with regards to $NO_x$ conversion and deposit mitigation.

Zone 2 covers a range wherein as the main SCR catalyst 30 and the DPF 46 gradually start warming up, the fraction of the DEF dosed through close coupled SCR catalyst injector 52 at the close coupled SCR catalyst 56 decreases, and the fraction of the DEF dosed through main SCR catalyst injector 38 into the main SCR catalyst 30 increases, since the main SCR catalyst 30 becomes increasingly capable of optimal $NO_x$ conversion.

As the DPF 46 temperature increases to about 350° C., as shown in zone 3, the fraction of DEF dosing at the close coupled SCR catalyst 56 will decrease to its lowest value in the calibration map. Optimal passive soot oxidation occurs around 350° C. and it is beneficial to have higher $NO_x$/soot ratios entering the DPF 46 at 350° C. Since the main SCR catalyst 30 would have achieved light off in zone 2 (typically achieved at or slightly over 200° C. depending on main SCR catalyst 30 formulation), high $NO_x$ conversions would be expected. This would allow the engine out $NO_x$ levels to be optimized for the increased fuel economy. Generally, this would result in engine out $NO_x$ levels much higher than the standard aftertreatment design could tolerate while still meeting the tailpipe $NO_x$ targets.

When the DPF 46 temperature is above 350° C., the fraction of the desired total DEF dosing at the close coupled SCR catalyst 56 and main SCR catalyst 30 may again be adjusted to achieve optimal performance. While it will be possible to achieve high levels of $NO_x$ conversion over the main SCR catalyst 30 there are also advantages to reducing the $NO_x$ levels entering the main SCR catalyst 30. Since the main SCR catalyst 30 may be Cu zeolite only or a zoned Fe zeolite plus Cu zeolite formulation, there is an increase in the amount of $N_2O$ that may form over the Cu formulation. Since $N_2O$ is a potent greenhouse gas (GHG), it will be necessary to reduce the $NO_x$ levels entering the main SCR catalyst 30. As a result, under theses conditions (component temperatures above 450° C.), it will be necessary to increase the fraction of DEF dosing at the close coupled SCR catalyst 56 location. As a result in the section of the additional map that corresponds to elevated temperatures at the main SCR catalyst 30, as shown in zone 4, the fraction of the desired total DEF to be dosed at the close coupled SCR catalyst 56, will gradually increase. The various temperature thresholds may vary from the values presented above based on the material properties of the main SCR and the close coupled SCR and engine operating conditions such as engine out $NO_x$, exhaust mass flow, Ammonia $NO_x$ ratio and the like.

FIG. 5 is another representation of the additional calibration map in the form of a logic diagram 58. Block 60 starts off the logic with the calculation of the desired total DEF to be injected into the aftertreatment system. Block 62 checks to see which of the two SCR catalysts, the main SCR catalyst 30 and the close coupled SCR catalyst 56, are above a T(th), that is, above the threshold temperature for DEF dosing (190° C.).

If it is determined that only the close coupled SCR catalyst 56 is above the T(th), the logic moves to block 64 and the entire desired total DEF dosing quantity is injected through close coupled SCR catalyst injector 52 at the close coupled SCR catalyst 56 location, corresponding to zone 1 in FIG. 4. If both the close coupled SCR catalyst 56 and the main SCR catalyst 30 are above the threshold temperature T(th), the logic progresses on to block 68 where the temperature of the main SCR catalyst 30 is determined. If the temperature of the main SCR catalyst 30 is greater than the threshold temperature, T(th), however is less than the temperature when the rate of passive soot oxidation starts to become significant, (T(passive, start) usually 250° C.), the logic moves to block 70, wherein the DEF is injected into both the close coupled SCR catalyst 56 and main SCR catalyst 30 locations in a gradually increasing quantity to the main SCR catalyst 30 as the main SCR catalyst 30 heats up, as also shown in zone 2 of FIG. 4.

Alternatively, if the temperature of the main SCR catalyst 30 is greater than T(passive,start) but is also lower than the temperature when the rate of passive soot oxidation starts to decrease from lack of $NO_2$, and lower than the temperature when the rate of $N_2O$ formation (T($N_2O$ formation)) over the main SCR catalyst 30 becomes higher than a predetermined threshold based on conditions such as the engine out $NO_x$ levels, usually at 450° C. or higher, the fraction of the desired total DEF injected into the close coupled SCR catalyst 56 is limited to allow for the highest possible $NO_x$ soot ratio for passive regeneration and the main SCR catalyst 30 is able to lower the $NO_x$ levels out of the close coupled SCR catalyst 56 down to a desired tailpipe emission level, as shown in block 72 and in zone 3 of FIG. 4.

In the event that the temperature in the main SCR catalyst 30 is either greater than the T(Passive, stop) or the T ($N_2O$ formation), dosing is maximized to the close coupled SCR catalyst 56 so that the $N_2O$ formation over the entire system is reduced and the $NO_x$ conversion over the entire system results in the desired tailpile $NO_x$ values. Additionally, DEF deposits on the close coupled SCR 56 may be avoided, as also shown in zone 4 of FIG. 4. The various temperature thresholds may vary from the values presented in FIG. 5 based on the material properties of the main SCR and the close coupled SCR and engine operating conditions such as engine out NOx, exhaust mass flow, Ammonia NOx ratio and the like.

Figure 6A:
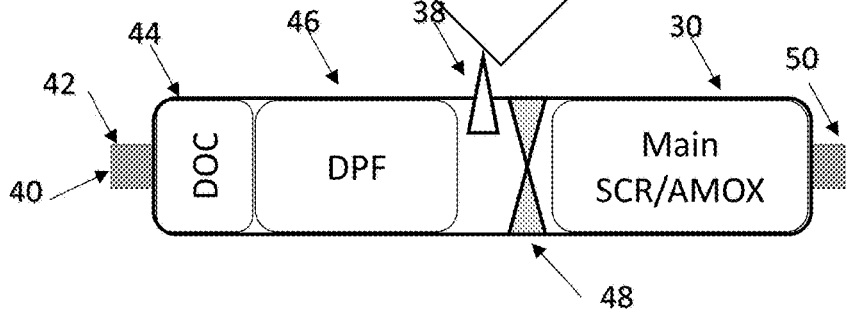
FIG. 6A is a table showing the prior art dosing calculation.
Figure 6B:
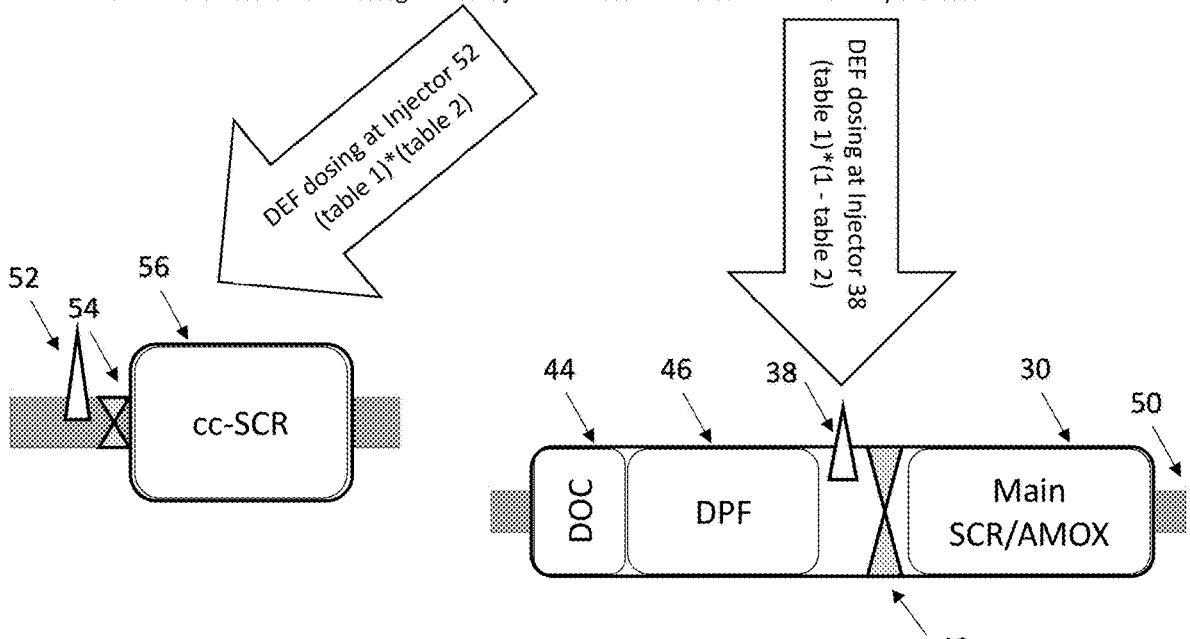
FIG. 6B is a table showing the dual dosing calculation.

FIG. 6A is representative of a dosing table and calculation used for the current single point DEF injection through main SCR catalyst injector 38 and FIG. 6B is representative of dosing tables and calculations used for and the amended method of dual point DEF injection through injectors 38 and 52 corresponding to the main SCR catalyst 30 and close coupled SCR catalyst 56, respectively.

Referring to FIG. 6A, the table represents the desired total DEF dosing quantity based on the $NO_x$ mass flow that may be measured by using a flow sensor in the exhaust manifold (not shown) or may be modeled based on a number of engine conditions that include speed, load and fueling, amongst others and temperature measured at the main SCR catalyst 30 using a temperature sensor.

The desired total dosing quantity may be calculated in a number of ways, including, based on prior and publicly available state of the art calculations. The desired total DEF dosing is determined and the dosing command is provided to the main SCR catalyst injector 38.

FIG. 6B represents the calculation to determine the fraction of the desired total DEF dosing at the two injection locations, main SCR catalyst injector 38 and close coupled SCR catalyst injector 52. Table 1 is the same table as presented in FIG. 6A. There is an additional table 2 that calculates the fraction of the DEF dosing quantity at the close coupled SCR catalyst injector 52 based on the mass NOx and temperature. So, the fraction of the desired total DEF to be dosed through close coupled SCR catalyst injector 52 is:

(desired total DEF dosing quantity from table 1 for a given mass $NO_x$ and temperature)*(fraction of desired total DEF dosing quantity).

Furthermore, the fraction of the desired total DEF dosing quantity at main SCR catalyst injector 38 is calculated by using the following formula:

(desired total DEF dosing quantity from table 1 for a given mass $NO_x$ and temperature)*(1−fraction of desired total DEF dosing quantity).

For example, a $NO_x$ value of 0.20 mass flow units (may be g or kg, for example), and the main SCR catalyst 30 at a temperature of 160° F., corresponds to '1' in table 2. Using the above formulas, this would mean that 100% of the dosing is done through close coupled SCR catalyst injector 52 and 0% of the dosing is done through main SCR catalyst injector 38, representing zone 1 conditions as discussed in FIG. 4.

Table 2 is further broken down in order to clarify the values that correspond with the four zones highlighted in FIG. 2. FIG. 7A represents the fraction of dosing at close coupled SCR catalyst injector 52 in zone 1 when all of the calculated desired dosing quantity is injected through close coupled SCR catalyst injector 52 into the close coupled SCR catalyst 56.

FIG. 7B represents the percentage of dosing at close coupled SCR catalyst injector 52 in zone 2, where it can be observed that as the NOx value increases, and the temperature at the main SCR catalyst 30 increases, there is a gradual reduction in the DEF dosing at close coupled SCR catalyst injector 52 and a gradual increase in the dosing at main SCR catalyst injector 38.

FIG. 7C represents the fraction of dosing at close coupled SCR catalyst injector 52 in zone 3 when the temperature in the main SCR catalyst 30 is further increased.

Finally FIG. 7D represents the last three rows of table 2, where the temperature is highest and the dosing at close coupled SCR catalyst injector 52 is higher at lower $NO_x$ and decreases as the $NO_x$ increases and increases as the temperature of the main SCR catalyst 30 increases. While this is true under all zones, the dosing into the close coupled SCR 52 is relatively lower in zones 3 and 4 as compared to zones 1 and 2 for the same $NO_x$ mass flow values. This is because, as can be seen from FIG. 2, the main SCR catalyst 30 is running optimized for passive soot oxidation in zone 3 and is running for optimized levels of $NO_x$ in zone 4 until the main SCR catalyst 30 temperature reaches a high enough temperature to start increasing the dosing in close coupled SCR catalyst injector 52.

What is claimed is:

1. An internal combustion engine generating exhaust, the internal combustion engine comprising:
an exhaust aftertreatment system comprising a diesel oxidation catalyst, a diesel particulate filter, a close coupled SCR catalyst for converting NOx in the exhaust into nitrogen and water by selective catalytic reduction upstream of the diesel oxidation catalyst and the diesel particulate filter and a main SCR catalyst for converting NOx in exhaust into nitrogen and water by selective catalytic reduction downstream of the diesel oxidation catalyst and the diesel particulate filter;
a Diesel Exhaust Fluid (DEF) dosing system comprising a first injector and a first mixer to inject and distribute a first quantity of DEF of a desired total DEF quantity into the close coupled SCR catalyst and a second injector and a second mixer to inject and distribute a second quantity of DEF of the desired total DEF quantity into the main SCR catalyst;
a controller for controlling the first quantity of DEF and the second quantity of DEF; wherein
the controller calculates the first quantity of DEF to be injected by using a plurality of predetermined maps based on temperature of the main SCR catalyst and a mass flow of the NOx flowing into the exhaust aftertreatment system and wherein;
the controller additionally calculates the second quantity of DEF to be injected based on the difference between the desired total DEF quantity and the first quantity of DEF.

2. The internal combustion engine of claim 1 wherein the first quantity of DEF to be injected through the first injector is additionally calculated based on temperature of the diesel particulate filter.

3. The internal combustion engine of claim 1 where in the first injector is upstream of the close coupled SCR catalyst and the second injector is upstream of the main SCR catalyst and downstream of the diesel particulate filter.

4. The internal combustion engine of claim 1 wherein the close coupled SCR is a vanadium-based formulation.

5. The internal combustion engine of claim 1 wherein the main SCR is a Cu Zeolite formulation.

6. The internal combustion engine of claim 1 wherein temperature of the main SCR is measured using a temperature probe in the main SCR and the mass flow of the NOx is measured using a flow sensor placed in the exhaust manifold.

7. A control system of an internal combustion engine, the control system comprising:
a controller;
a first data source providing data defining a first value of a main SCR temperature;
a second data source providing a mass flow of NOx;
a first pre-determined map determining a desired total DEF dosing quantity based on the main SCR temperature and the mass flow of NOx;
a second pre-determined map determining a desired first fraction of the desired total DEF dosing quantity through a first injector; wherein
the controller calculates a first DEF dosing quantity through the first injector based on the first fraction of the desired total DEF dosing quantity and the desired total DEF dosing quantity; and commands the first injector to inject the calculated first DEF dosing quantity; and wherein
the controller additionally commands a second injector to inject a second fraction of the desired total DEF dosing quantity; the second fraction of the desired total DEF dosing quantity determined by calculating the difference between the desired total DEF dosing quantity and the desired first fraction of the desired total DEF dosing quantity.

8. The control system of claim 7; wherein the first data source is a temperature sensor.

9. The control system of claim 7, wherein the second data source is at least one of a flow sensor and a model.

10. The control system of claim 7; wherein the first injector is upstream of a close coupled SCR catalyst.

11. The second, injector of claim 7; wherein the second injector is upstream of the main SCR catalyst.

\* \* \* \* \*